W. P. BRADSHAW.
MOTOR VEHICLE.
APPLICATION FILED MAY 6, 1914.
1,138,447.
Patented May 4, 1915.
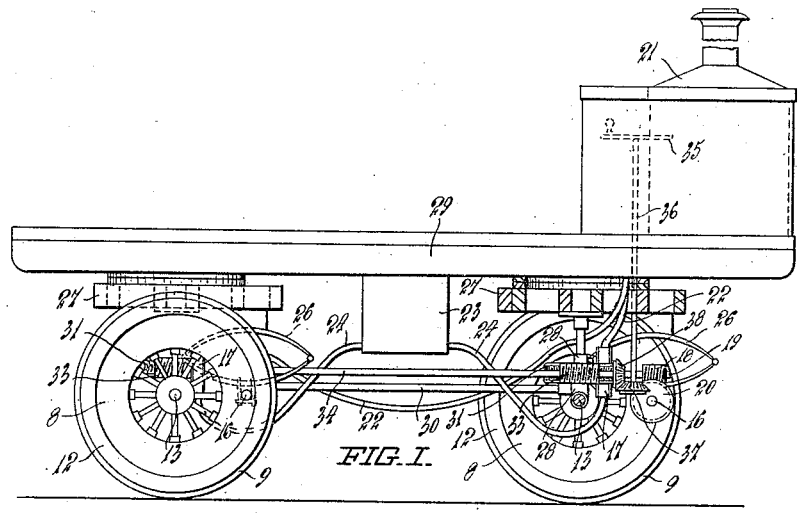
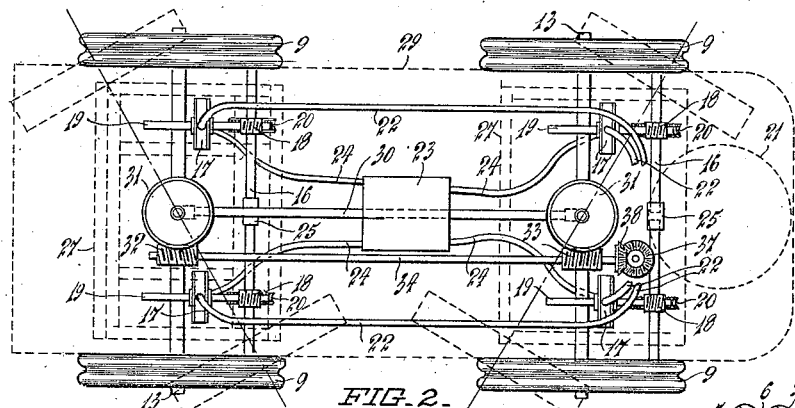
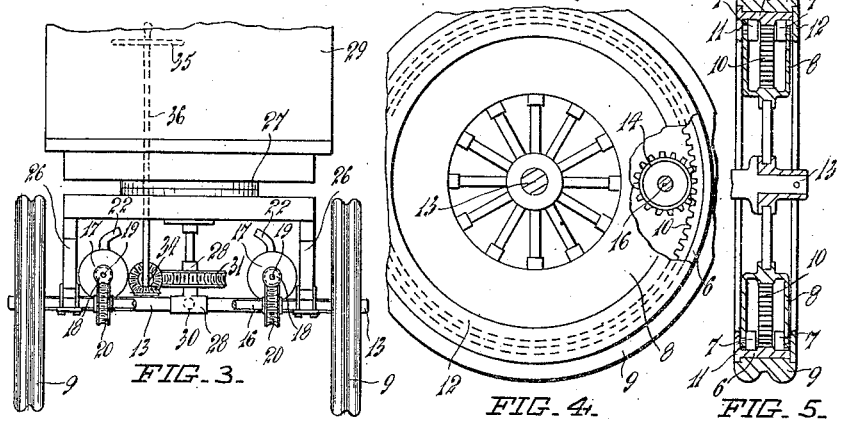
Witnesses:
Charles B Brompton
May G. Luttrell
W. P. Bradshaw.
Inventor.
By Braydon Marks
Attorney.

UNITED STATES PATENT OFFICE.

WILLIAM PRATT BRADSHAW, OF SYDENHAM, CHRISTCHURCH, NEW ZEALAND.

MOTOR-VEHICLE.

1,138,447.

Specification of Letters Patent.

Patented May 4, 1915.

Application filed May 6, 1914. Serial No. 836,707.

*To all whom it may concern:*

Be it known that I, WILLIAM PRATT BRADSHAW, a citizen of the Dominion of New Zealand, and residing at Falgrave street, Sydenham, Christchurch, in the Provincial District of Canterbury, in the Dominion of New Zealand, have invented certain new and useful Improvements in Motor-Vehicles, of which the following is a specification.

This invention relates to motor vehicles and provides improvements whereby the working and operating of such vehicles is greatly facilitated, and the working parts are simplified.

By my invention improvements are made in the driving and steering mechanism, which will now be described by the aid of the accompanying drawing, wherein:—

Figure 1, is a side elevation, Fig. 2, a plan, and Fig. 3, an end view of a vehicle embodying the invention, Fig. 4, is a side elevation, and Fig. 5, a cross sectional elevation of a wheel on a larger scale.

Each of the wheels of the vehicle is made with a rim 6 mounted upon rollers 7 journaled around the periphery of a wheel center 8, so that the rim can be rotated upon the wheel center. A rubber tire 9 of any usual and suitable make such as the tire known as "the Continental tire" is fixed to the rim 6.

The rim 6 is made with an internal toothed wheel 10 and has a fixed flange 11 and a removable flange 12, which receive the wheel center 8. The rim of the wheel center is hollow and contains the rollers 7 which are mounted on ball bearings. The wheel centers 8 are fixed to their axles 13 which do not rotate and the rims 6 and tires 9 are rotated around the centers 8 by the driving mechanism to be described. On each wheel of the vehicle a toothed pinion 14 gearing with the toothed wheel 10 is fixed to a counter shaft 16 which is driven by a steam turbine 17 through the medium of a worm 18 fixed to the shaft 19 of the turbine and by a worm wheel 20 fixed to the counter shaft 16. Steam is supplied to the turbine from a boiler 21 by a flexible pipe 22, and the exhaust steam therefrom passes to a condenser 23 by a flexible pipe 24. The counter shafts upon each pair of the vehicle wheels are coupled together by a sleeve 25 or by differential gear.

The springs 26 supporting the body 29 of the vehicle are mounted upon the counter shafts 16, which are journaled upon the wheel centers 8 and the springs 26. Each pair of vehicle wheels is provided with a turn table 27 pivoted to the body 29, and a vertical member 28 fixed to each axle 13 telescopes upon a stud fixed to each turn table. A rod 30, pivoted upon the vertical members 28 of both pairs of wheels, unites the front and back axles 13 together. Worm wheels 31 fixed to the members 28 gear with right and left worms 32 and 33 secured to the front and back ends respectively of a fore and aft rod 34, which is operated by a hand wheel 35 through the medium of a rod 36 and miter wheels 37 and 38. When the hand wheel 35 is operated, the turntables and wheels of the vehicle swivel in reverse directions, as shown by dotted lines in Fig. 2, for the purpose of turning the vehicle around a short radius.

What I do claim and desire to secure by Letters Patent of the United States is:—

In a motor vehicle the combination of a body, turntables pivoted to said body, a pair of axles carrying the vehicle wheels, vertical members on said axles connected with said turntables, worm wheels fixed to said vehicle members, a longitudinal rod having worms for engaging said worm wheels and adapted to operate the latter simultaneously in opposite directions, and means for operating said rod from the body of the vehicle.

In testimony whereof I have signed my name to this specification in the presence of two witnesses.

WILLIAM PRATT BRADSHAW.

Witnesses:
 GEORGE A. J. HART,
 RENNIE W. OWEN.

Copies of this patent may be obtained for five cents each, by addressing the "Commissioner of Patents, Washington, D. C."